United States Patent [19]

Buding et al.

[11] Patent Number: 4,774,295

[45] Date of Patent: Sep. 27, 1988

[54] POLYMER MIXTURES AND COVULCANIZATES PRODUCED THEREFROM

[75] Inventors: Hartmuth Buding, Dormagen; Heinrich Königshofen, Bergisch Gladbach; Zsolt Szentivanyi; Joachim Thörmer, both of Leverkusen, all of Fed. Rep. of Germany

[73] Assignee: Bayer Aktiengesellschaft, Leverkusen, Fed. Rep. of Germany

[21] Appl. No.: 940,295

[22] Filed: Dec. 11, 1986

Related U.S. Application Data

[63] Continuation of Ser. No. 762,947, Aug. 6, 1985, abandoned.

[30] Foreign Application Priority Data

Aug. 18, 1984 [DE] Fed. Rep. of Germany ....... 3430436
Aug. 23, 1984 [DE] Fed. Rep. of Germany ....... 3431012
Feb. 27, 1985 [DE] Fed. Rep. of Germany ....... 3506836

[51] Int. Cl.$^4$ .............. C08L 9/02; C08L 23/08; C08L 23/34; C08L 27/06
[52] U.S. Cl. .................. 525/233; 525/239; 525/240
[58] Field of Search ............ 525/233, 239, 240

[56] References Cited

U.S. PATENT DOCUMENTS

| | | | |
|---|---|---|---|
| 2,968,637 | 1/1961 | Bowers, III | 525/233 |
| 3,700,637 | 10/1972 | Finch, Jr. | 525/329.3 |
| 4,341,884 | 7/1982 | Schepers | 525/240 |

Primary Examiner—Jacob Ziegler
Attorney, Agent, or Firm—Connolly & Hutz

[57] ABSTRACT

Covulcanizates with good mechanical properties obtained from mixtures of (a) from 50 to 5% by weight of chlorinated or chlorosulphonated polyethylene, acrylate rubber or ethylene vinyl alcohol copolymers and (b) from 50 to 95% by weight of partially or completely hydrogenated nitrile group-containing elastomers containing from 25 to 140 nitrile nitrogen atoms and less than 35 double bonds for each 1,000 carbon atoms, by cross linking.

7 Claims, No Drawings

POLYMER MIXTURES AND COVULCANIZATES PRODUCED THEREFROM

This application is a continuation of Ser. No. 762,947, filed on Aug. 06, 1985, now abandoned.

The invention relates to vulcanizable polymer mixtures of (a) chlorinated or chlorosulphonated polyethylene, acrylate rubber or ethylene vinyl alcohol copolymers and (b) partially or completely hydrogenated nitrile group-containing elastomers and the covulcanizates produced therefrom by cross linking.

Chlorinated polyethylene is known, for example, from Römpp's Chemie-Lexikon, 8th edition (1979) volume 1, page 730 and is obtained by chlorination of polyethylene. Types containing from 23 to 45% by weight of chlorine are particularly suitable for the mixtures according to the invention.

Chlorosulphonated polyethylene is also known from Römpp's Chemie-Lexikon, 8th edition (1983) volume 3, page 1814 (Hypalon) and is obtained by reaction of polyethylene with chlorine and $SO_2$ (Cl content 20–40% by weight; S content 0.5–3% by weight).

Up to 40% by weight of the chlorinated or chlorosulphonated ethylene can be replaced by poly vinyl chloride. Preferably, less than 20% by weight of this component are replaced by polyvinyl chloride.

Acrylate rubbers are bi- or terpolymers of acrylic acid esters and acrylonitrile and/or vinyl acetate as well as polymers which additionally contain ethylene or small quantities of non-conjugated dienes. Acrylate rubbers are known, for example, from DE-OS 29 49 341, DE-OS 28 43 041 or "Kautschuk-Gummi-Kunststoff" 35, No. 5 (1982), pages 378 ff.

With these polymers, cross-linking is not generally carried out using peroxides because the mechanical properties of the products of this cross-linking are inadequate.

Preferred monomers of acrylate rubbers include ethyl acrylate, butylacrylate, methoxyethylacrylate, ethoxyethylacrylate, chloroethylacrylate, glycidylacrylate and hydroxyethylacrylate. Acrylic acid, acrylonitrile and vinyl acetate can also be copolymerised.

In particular, the acrylate rubber should contain as comonomer at least 5% by weight of hydroxyethylacrylate or halogenethylacrylate.

Ethylene vinyl alcohol copolymers are usually obtained by saponification of ethylene vinyl acetate copolymers. The vinyl alcohol content of the polymer is therefore dependent on the original vinyl acetate content and on the degree of saponification.

Partially or completely hydrogenated nitrile group containing elastomers are obtained, for example, by hydrogenation of nitrile rubbers (butadiene-acrylonitrile-copolymers). The vulcanizates thereof are distinguished by high strength.

Such elastomers are known, for example, from US-PS 3 700 637 and German Offenlegungsschriften 25 39 132 and 29 13 992.

German Offenlegungsschrift 31 41 573 discloses an oil-resistant rubber mixture of partially hydrogenated nitrile rubber and polyvinyl chloride.

This mixture has drawbacks owing to its inadequate properties at low temperatures and the impaired compression set at high temperatures. Furthermore, properties such as elasticity and hardness change significantly at elevated temperatures owing to the softening of the polyvinyl chloride.

It has now surprisingly been found that mixtures of the type mentioned at the outset have excellent properties when cold and excellent compression set even at high temperatures despite their similar overall composition. Moreover, the viscosities of the mixtures are lowered, the ageing properties improved and the swelling in mineral oil is reduced.

An object of the invention are therefore mixtures of (a) from 50 to 5% by weight, preferably from 30 to 10% by weight of chlorinated or chlorosulphonated polyethylene, acrylate rubber or ethylene vinyl alcohol copolymers and (b) from 50 to 95% by weight, preferably from 70 to 90% by weight of nitrile group containing elastomers with from 25 to 140 nitrile nitrogen atoms for each 1,000 carbon atoms and less than 35, preferably less than 12 double bonds, preferably less than 3 double bonds for each 1,000 carbon atoms as well as (c) conventional mixing constituents, the percentages being based on the sum of (a) and (b).

A further object of the invention are covulcanizates which are obtained by high-energy radiation, peroxide cross-linking or sulphur cross-linking from the above-mentioned mixtures.

Preferred starting materials for the production of the partially or completely hydrogenated nitrile group containing elastomers are nitrile rubbers containing from 10 to 48% by weight of (meth)acrylonitrile, from 50 to 90% by weight of a conjugated diene with 4 to 9 carbon atoms and from 0 to 30% by weight of a third monomer, for example (meth)acrylic acid, (meth)acrylic acid alkylester or vinyl acetate, which are hydrogenated according to DE-OS 17 95 819.

The nitrile rubbers are preferably composed of from 48 to 15% by weight of acrylonitrile and from 52 to 85% by weight of butadiene or isoprene.

Conventional constituents of mixtures in a rubber mixture are known to the skilled man, such as fillers, plasticizers, age-resistors, processing auxiliaries, pigments, acid acceptors and vulcanizing chemicals, wherein peroxides, sulphur or sulphur donors are used for vulcanizing the rubber mixture according to the invention.

From 0.1 to 5, preferably from 0.1 to 1.8% by weight of sulphur, based on the polymer, and from 0.2 to 8, preferably from 2 to 4% by weight of sulphur donor, based on the polymer, are used.

Suitable sulphur donors include, for example, tetraalkylthiuram disulphides, cycloalkylthiuram disulphides, arylalkylthiuram disulphides, tetraalkylthiuram tetrasulphides or morpholinyldithiobenzothiazole.

X-ray, γ or electron radiation are suitable as high-energy radiation. Cobalt-60 and electron accelerators are suitable sources of radiation.

Peroxides are preferably used.

Suitable peroxide include, for example, dialkylperoxides, ketalperoxides, aralkylperoxides, peroxyethers, peroxyesters.

Di-tert.-butylperoxide, bis-(tert.-butylperoxyisopropylbenzene), dicumylperoxide, 2,5-dimethyl-2,5-di(-tert.-butyl-peroxy)-hexane, 2,5-dimethyl-2,5-di(tert.-butylperoxy)-hexene-(3), 1,1-bis(tert.-butylperoxy)-3,3,5-trimethylcyclohexane, benzoylperoxide, tert.-butylcumylperoxide or tert.-butyl-perbenzoate are preferably used.

The quantities of peroxide are from 1 to 15% by weight, preferably from 2 to 5% by weight, based on the rubber solids.

The covulcanizates are very stable in hot air and also demonstrate minimal swelling in coolants, for example polyglycol ethers and in mineral oil and demonstrate an excellent quality level in the other essential rubber properties. They are therefore particularly suitable for the production of seals, tubes, tube bores and other rubber articles for applications with specific requirements.

EXAMPLE 1

The following mixtures (parts by weight) were produced in 15 minutes on a laboratory roller heated to 155° C.

|  | Mixtures | | |
| --- | --- | --- | --- |
|  | A | B | C |
| Polymer I | 65 | 65 | 65 |
| Polymer II | 35 | 20 | — |
| Polymer III | — | 15 | 35 |
| 2-Mercaptobenzimidazole | 0.4 | 0.4 | 0.4 |

Polymer I is a hydrogenated acrylonitrile butadiene copolymer having an acrylonitrile content of 34% by weight, a degree of hydrogenation of >99% and a Mooney viscosity ML at 100° C. (1+4) of 72 ME.

Polymer II is a polyvinyl chloride having a K value of 70.

Polymer III is a chlorinated polyethylene having a chlorine content of 36% by weight and a Mooney viscosity ML at 120° C. (1+4) of 85 ME.

These basic mixtures were processed according to the following formulation to form vulcanizable mixtures (details as parts by weight).

A is a comparison test.

|  | A | B | C |
| --- | --- | --- | --- |
| Mixture A | 100 | — | — |
| Mixture B | — | 100 | — |
| Mixture C | — | — | 100 |
| Vinylsilane | 1.5 | 1.5 | 1.5 |
| Silicic acid | 30.0 | 30.0 | 30.0 |
| Stearic acid | 1.0 | 1.0 | 1.0 |
| Silica | 100.0 | 100.0 | 100.0 |
| 2,2,4-trimethyl-1,2-dihydro-quinoline-polymer | 1.0 | 1.0 | 1.0 |
| Plasticizer (mixture of carboxylic acid esters and thiocarboxylic acid esters) | 10.0 | 10.0 | 10.0 |
| Plasticizer (alkylsulfonic acid alkylphenylester) | 15.0 | 15.0 | 15.0 |
| MgO | 8.0 | 8.0 | 8.0 |
| Ethylene glycol | 2.0 | 2.0 | 2.0 |
| Triallylcyanurate | 2.5 | 2.5 | 2.5 |
| Bis-(tert.-butylperoxy-isopropylbenzene), 40% | 7.0 | 7.0 | 7.0 |
| Mooney-viscosity ML 3 + 5/100° C. [ME] | 102 | 88 | 84 |

The vulcanization was carried out for 15 minutes at 180° C. The following values were determined.

|  | A | B | C |
| --- | --- | --- | --- |
| Tensile strength [MPa] | 15 | 14 | 13 |
| Breaking elongation [%] | 280 | 290 | 350 |
| Hardness 23° C. [Shore A] | 85 | 84 | 77 |
| Hardness 70° C. [Shore A] | 79 | 79 | 75 |
| Resilience 23° C. [%] | 17 | 22 | 31 |
| Resilience 70° C. [%] | 45 | 44 | 44 |
| Compression Set 23° C./70 h | 30 | 29 | 31 |
| Compression Set 125° C./70 h | 71 | 61 | 49 |
| Brittleness Point [°C.] | −16 | −22 | −26 |
| Torsional Vibration max [°C.] | −1 | −7 | −17 |
| After ageing in hot air for 7 days at 135° C. | | | |
| Strength $F/F_o$ [%] | 154 | 139 | 131 |
| Breaking elongation $D/D_o$ [%] | 21 | 28 | 52 |
| Ageing in fuel 2 + 1% by weight lauroyl peroxide (acid gas values after back drying) 28 days at 40° C. | | | |
| Strength $F/F_o$ [%] | 93 | 98 | 97 |
| Breaking elongation $D/D_o$ [%] | 64 | 59 | 70 |

The ageing fluid was renewed alternately every third and fourth day. The back drying was carried out for 48 hours at 40° C. in a vacuum.

The compression set samples were tempered at 160° C. for 5 hours.

The torsional vibration diagrams show that polymer III is compatible with polymer I and II.

DIN standards applied: 53502, 53504, 53505, 53512, 53517, 53546, 53520.

Examples 1B and 1C show that clear improvements were achieved by the partial or complete substitution of chlorinated polyethylene for PVC.

EXAMPLE 2

The following mixture (parts by weight) was produced on a roller at 40° C.:

| Polymer I | 60 |
| --- | --- |
| Chlorosulphonated Polyethylene containing 35% by weight of Cl and 1.2% by weight of S | 40 |
| Epoxidised soybean oil | 2.0 |
| Nickeldibutyldithiocarbamate | 1.0 |
| Magnesium oxide | 2.0 |
| Bis-(tert.-hydroperoxyisopropylbenzene) | 3.0 |

The mixture was vulcanized for 10 minutes at 170° C.

The torsional vibration diagram shows that polymer I and the chlorosulphonated polyethylene are compatible with each other.

EXAMPLE 3

The following mixtures (parts by weight) were prepared on a laboratory roller heated to 50° C. Boards having dimensions of 100×100×2 mm were produced from the mixtures, vulcanized at 180° C. for 15 minutes and tempered at 150° C. for 17 hours.

Some S 2 rods according to DIN 53 504 were punched from the boards and the properties specified below were measured on these rods.

Polymer IV is a copolymer of 44.5% by weight of butylacrylate, 30% by weight of ethylacrylate, 24% methoxyethoxyacrylate and 1.5% by weight of glycidylacrylate.

Polymer V is a copolymer of 92% by weight of butyl acrylate, 7% by weight of acrylonitrile and 1% by weight of acrylic acid.

|  | A | B | C | D | E | F | G | H |
|---|---|---|---|---|---|---|---|---|
| Mixture |  |  |  |  |  |  |  |  |
| Polymer I | 100 | 80 | 60 | 0 | 100 | 80 | 60 | 0 |
| Polymer IV | 0 | 20 | 40 | 100 | 0 | 0 | 0 | 0 |
| Polymer V | 0 | 0 | 0 | 0 | 0 | 20 | 40 | 100 |
| Stearic acid | 0.5 | 0.5 | 0.5 | 0.5 | 0.5 | 0.5 | 0.5 | 0.5 |
| Magnesium oxide | 3.0 | 3.0 | 3.0 | 3.0 | 3.0 | 3.0 | 3.0 | 3.0 |
| Active Zinc Oxide | 3.0 | 3.0 | 3.0 | 3.0 | 3.0 | 3.0 | 3.0 | 3.0 |
| Styrenated Diphenylamine | 1.5 | 1.5 | 1.5 | 1.5 | 1.5 | 1.5 | 1.5 | 1.5 |
| Zinc-Salt of Mercaptobenzimidazole | 1.5 | 1.5 | 1.5 | 1.5 | 1.5 | 1.5 | 1.5 | 1.5 |
| Polycarbodiimide (50%) | 0.3 | 0.3 | 0.3 | 0.3 | 0.3 | 0.3 | 0.3 | 0.3 |
| Carbon Black N 683 | 65 | 65 | 65 | 65 | 65 | 65 | 65 | 65 |
| Triallylisocyanurate | 2.0 | 2.2 | 2.4 | 3.0 | 2.0 | 2.2 | 2.4 | 3.0 |
| Bis-(tert.-butylperoxyisopropyl)-benzene | 8.0 | 7.0 | 6.0 | 3.0 | 8.0 | 7.0 | 6.0 | 3.0 |
| Mooney-Viscosity ML 1 + 4 100° C. (ME) | 140 | 101 | 97 | 81 | 140 | 131 | 113 | 135 |
| Density [g/cm$^3$] | 1.21 | 1.21 | 1.26 | 1.35 | 1.21 | 1.23 | 1.25 | 1.31 |
| Vulcameter 190° C. $t_{10}$ [min] | 1.6 | 1.7 | 1.7 | 2.0 | 1.6 | 1.7 | 1.7 | 2.4 |
| Vulcameter 190° C. $t_{90}$ [min] | 4.9 | 4.8 | 6.2 | 39.6 | 4.9 | 5.6 | 7.5 | 48.1 |
| Vulcanisation time 190° C. [min] | 10 | 10 | 10 | 45 | 10 | 10 | 15 | 55 |
| Tempering Time 160° C. [hours] | 4 | 4 | 4 | 4 | 4 | 4 | 4 | 4 |
| Tensile Strength [MPa] | 28 | 25 | 21 | 10 | 28 | 23 | 18 | 8 |
| Break elongation [%] | 220 | 220 | 160 | 180 | 220 | 180 | 160 | 180 |
| Modulus 100% [MPa] | 12 | 10 | 15 | 6 | 12 | 12 | 12 | 4.6 |
| Shore-A-Hardness RT | 81 | 76 | 80 | 68 | 81 | 79 | 78 | 62 |
| C.S. 70 h 100° C. | 24 | 29 | 34 | 52 | 24 | 30 | 34 | 59 |
| Hot air ageing at 175° C./72 hours |  |  |  |  |  |  |  |  |
| $F/F_o$ [%] | 94 | 86 | 97 | 134 | 93 | 93 | 87 | 126 |
| $D/D_o$ [%] | 55 | 52 | 62 | 50 | 56 | 61 | 48 | 56 |
| Hardness [Shore A] | +7 | +10 | +10 | +15 | +7 | +9 | +12 | +13 |
| Ageing in Motor Oil [Vanellus T(B.P.)] 14 days 150° C. |  |  |  |  |  |  |  |  |
| $F/F_o$ [%] | 95 | 95 | 102 | 131 | 95 | 86 | 98 | 94 |
| $D/D_o$ [%] | 72 | 65 | 100 | 50 | 72 | 67 | 84 | 78 |
| Hardness [Shore A] | −4 | −1 | −2 | +8 | −4 | −2 | −4 | −10 |
| Swelling in volume [%] | +9 | +9 | +6 | +4 | +9 | +10 | +10 | +20 |

EXAMPLE 4

Mixing, vulcanization and testing carried out as in Example 3.

Polymer VI is a partially hydrogenated acrylonitryl-butadiene-copolymer having an acrylonitrile content of 34% by weight, a degree of hydrogenation of 93% and a Mooney viscosity ML 100° C. (1+4) of 67 ME.

Polymer VII is a hydrogenated acrylonitrile-butadiene-copolymer having an acrylonitrile content of 34% by weight, a degree of hydrogenation of 99% and a Mooney viscosity ML 100° C. (1+4) of 70 ME.

Polymer VIII is a copolymer of 45% by weight of ethylene and 55% by weight of vinyl alcohol and has a melting index of 65.4 (ASTM-D 1238-82 method E).

Polymer IX is a copolymer of 70% by weight of ethylene and 30% by weight of vinyl alcohol and has a melt index of 38.9.

|  | A | B | C | D | E | F |
|---|---|---|---|---|---|---|
| Mixture |  |  |  |  |  |  |
| Polymer VII | 100 | 90 | 0 | 0 | 90 | 0 |
| Polymer VI | 0 | 0 | 75 | 100 | 0 | 85 |
| Polymer IX | 0 | 0 | 0 | 0 | 10 | 0 |
| Polymer VIII | 0 | 10 | 25 | 0 | 0 | 15 |
| Magnesiumoxide | 7.0 | 7.0 | 7.0 | 7.0 | 7.0 | 7.0 |
| Active Zinc Oxide | 3.0 | 3.0 | 3.0 | 3.0 | 3.0 | 3.0 |
| Styrenated Diphenylamine | 1.1 | 1.1 | 1.1 | 1.1 | 1.1 | 1.1 |
| Zinc Salt of Mercaptobenzimidazole | 0.4 | 0.4 | 0.4 | 0.4 | 0.4 | 0.4 |
| Carbon Black N 550 | 50 | 50 | 50 | 50 | 50 | 50 |
| Triallylisocyanurate | 1.5 | 1.5 | 1.5 | 1.5 | 1.5 | 1.5 |
| Bis-(tert.-butylperoxyisopropyl)-benzene | 7.5 | 7.5 | 7.5 | 7.5 | 7.5 | 7.5 |
| Vulcanizate |  |  |  |  |  |  |
| Tensile Strength [MPa] | 28 | 27 | 26 | 27 | 26 | 28 |

-continued

|  | A | B | C | D | E | F |
|---|---|---|---|---|---|---|
| Breaking elongation [%] | 280 | 275 | 175 | 270 | 265 | 225 |
| Compression Set Test DIN 53 517/A, 70 h/150° C. [%] | 31 | 31 | 33 | 34 | 31 | 34 |
| Compression Set Test on a O-Ring, 70 h/150° C. [%] | 61 | 47 | 44 | 60 | 47 | 45 |
| Swelling in Motor Oil SAE 20 W 20, 14 d/150° C., V [%] | 10 | 9.5 | 6 | 9.5 | 8 | 8 |
| Tensile Stress (100% elongation) [MPa] | 7.7 | 10.9 | 19.4 | 10.9 | 10.9 | 19.4 |

We claim:

1. A covulcanizate obtained by cross-linking a mixture consisting essentially of (a) from 50 to 5% by weight of chlorinated polyethylene, containing from 23 to 45% by weight chlorine, or chlorosulphonated polyethylene, containing from 20 to 40% by weight chlorine, acrylate rubber or ethylene vinyl alcohol copolymers and (b) from 50 to 95% by weight of a nitrile group containing elastomer with from 25 to 140 nitrile nitrogen atoms and less than 35 double bonds for each 1,000 carbon atoms.

2. A covulcanizate according to claim 1 of from 30 to 10% by weight of (a) and from 70 to 90% by weight of (b).

3. A covulcanizate according to claim 1, wherein (b) contains less than three double bonds for each 1,000 carbon atoms.

4. Mixtures according to claim 1, wherein up to 40% by weight of chlorinated or chlorosulphonated polyethylene (a) is replaced by polyvinyl chloride.

5. Mixtures according to claim 1, wherein the acrylate rubber contains at least 5% by weight of hydroxyethyl acrylate or halogenethyl acrylate.

6. Mixtures according to claim 1, wherein the ethylene vinyl alcohol copolymer has a vinyl alcohol content of from 20 to 70% by weight.

7. A covulcanizate according to claim 1, obtained by high-energy radiation, peroxide cross-linking or sulphur cross-linking.

* * * * *